(12) United States Patent
Persaud et al.

(10) Patent No.: US 8,875,743 B2
(45) Date of Patent: Nov. 4, 2014

(54) HANGER AND METHOD FOR ROUTING A HOT MELT HOSE

(71) Applicant: Nordson Corporation, Westlake, OH (US)

(72) Inventors: Raymond K. Persaud, Oxford, GA (US); John M. Riney, Buford, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/777,279

(22) Filed: Feb. 26, 2013

(65) Prior Publication Data

US 2014/0053938 A1    Feb. 27, 2014

Related U.S. Application Data

(60) Provisional application No. 61/693,012, filed on Aug. 24, 2012.

(51) Int. Cl.
| | |
|---|---|
| *F16L 3/00* | (2006.01) |
| *F16L 3/14* | (2006.01) |
| *F16L 3/24* | (2006.01) |
| *F16L 3/12* | (2006.01) |
| *F16L 3/10* | (2006.01) |

(52) U.S. Cl.
CPC ... *F16L 3/10* (2013.01); *F16L 3/14* (2013.01); *F16L 3/24* (2013.01); *F16L 3/12* (2013.01)
USPC .............. 138/107; 138/106; 248/73; 248/214

(58) Field of Classification Search
CPC ............... F16L 3/14; F16L 3/24; F16L 43/02; F16L 3/1226; F28F 25/02; E03C 1/021
USPC ......... 138/107, 106; 248/67.7, 58, 61, 62, 69, 248/74.3, 73

See application file for complete search history.

(56) References Cited

U.S. PATENT DOCUMENTS

| | | | | |
|---|---|---|---|---|
| 1,698,531 | A | * | 1/1929 | Brenizer ..................... 248/61 |
| 2,210,722 | A | * | 8/1940 | Klein ......................... 248/61 |
| 2,291,148 | A | * | 7/1942 | Carson ........................ 248/58 |
| 4,330,491 | A | * | 5/1982 | Doshi et al. ................ 261/111 |
| 4,524,937 | A | * | 6/1985 | Zizan ....................... 248/74.3 |
| D315,667 | S | | 3/1991 | Johnson |
| 5,048,462 | A | * | 9/1991 | Hostetler ..................... 119/72 |
| 5,752,853 | A | | 5/1998 | Curtindale |
| D466,793 | S | | 12/2002 | Kelleghan |
| D483,654 | S | | 12/2003 | Taylor |
| 7,386,955 | B1 | | 6/2008 | Repasky |

(Continued)

*Primary Examiner* — Patrick F Brinson
(74) *Attorney, Agent, or Firm* — Wood, Herron & Evans, L.L.P.

(57) ABSTRACT

A hanger and method for routing a hot melt hose adjacent to a structure includes a body having a through hole for receiving the hot melt hose. The through hole defines an inner surface adapted to support the hot melt hose without generally deforming the hot melt hose. The hanger also includes at least one of either a groove on the inner surface or a passage extending through the body for positioning the tie device. As such, the body is adapted to be supported by the tie device mounted to the structure. The hanger further spaces the hot melt hose from the adjacent structure. Thus, mechanical and thermal stresses may be minimized by supporting and spacing the hot melt hose from the adjacent structure without generally deforming the hot melt hose.

21 Claims, 7 Drawing Sheets

(56) References Cited

U.S. PATENT DOCUMENTS

| | | |
|---|---|---|
| D598,277 S | 8/2009 | Tsai |
| D601,879 S | 10/2009 | Kim et al. |
| D617,174 S | 6/2010 | Schaefer et al. |
| D621,479 S | 8/2010 | McNerney |
| 8,061,390 B2 * | 11/2011 | Condon et al. ............ 138/107 |
| 8,141,831 B2 * | 3/2012 | Julian et al. ............ 248/220.21 |
| D665,657 S | 8/2012 | Pelc |
| D669,754 S | 10/2012 | Wackwitz |
| 8,622,092 B1 * | 1/2014 | Condon et al. ............ 138/107 |
| 2008/0191102 A1 * | 8/2008 | Condon et al. ............ 248/67.7 |
| 2010/0213326 A1 * | 8/2010 | Julian et al. ............ 248/72 |

* cited by examiner

HANGER AND METHOD FOR ROUTING A HOT MELT HOSE

CROSS-REFERENCE TO RELATED APPLICATION

This application claims the priority of Application Ser. No. 61/693,012 filed Aug. 24, 2012 (pending), the disclosure of which is hereby incorporated by reference herein.

TECHNICAL FIELD

The present invention relates generally to a hanger and method for routing a hose, and more particularly, to routing a hot melt hose for use with a hot melt system.

BACKGROUND

The hot melt applications industry typically transfers hot melt components, such as liquids, amongst hot melt related equipment by way of a hot melt hose. These hot melt hoses may carry hot melt liquids at various pressures or temperatures depending on the specific application. Under the influence of this applied temperature and pressure, mechanical and/or thermal stresses may accumulate within the hot melt hose. However, by properly designing and selecting the appropriate hose for the given hot melt system, the risk of the hose failing during use greatly reduces. In addition, many hot melt hoses include an outer layer of thermal insulation surrounding a structural inner layer. This thermal insulation helps maintain the relatively high temperature of the hot melt traveling within the hose to improve efficiency of the hot melt system and inhibit operator contact with relatively high temperatures.

Hot melt hoses are frequently laid along the floor or mounted to various structures in order to route the hose from one piece of hot melt equipment to another. Hoses laid directly on the floor are prone to accumulate heat or absorb liquids at the floor surface creating thermal stress within the hot melt hose. Hot melt hoses are also frequently mounted to structures via tie devices, such as cable ties. Tie devices tightened on the hot melt hose for affixing the hose to the structure can deform the outer layer of insulation and structural inner layer resulting in increased thermal and mechanical stresses. Initially, these increased thermal and mechanical stresses may simply decrease the efficiency of the hot melt system. However, these stresses can also lead to mechanical failure of the hot melt hose resulting in additional time and money to replace the failed hot melt hose.

There is a need for improvements that address present challenges and characteristics such as those discussed above.

SUMMARY

One exemplary embodiment of the invention is a hanger for use with a tie device and a hot melt hose. The hanger includes a body having a through hole for receiving the hot melt hose. The through hole defines an inner surface. The inner surface is adapted to support the hot melt hose without generally deforming the hot melt hose. In addition, the body is adapted to be supported by the tie device and includes at least one of either a groove on the inner surface or a passage extending through the body for positioning the tie device within the groove or the passage. Thus, the hanger may include only the groove, only the passage, or both the groove and the passage.

In one aspect, the body is a ring-like structure adapted to surround the hot melt hose and includes an outer surface. The outer surface has at least one opening to the passage extending through the body for threading the tie device in and out of the hanger. However, the outer surface also includes another opening through which the tie device is threaded into one opening and out of the other opening. Furthermore, the outer surface has a generally planar portion for positioning the body against an abutting structure.

Another exemplary embodiment of the invention is an apparatus comprising a hot melt hose and a hanger. The hanger includes a body having a through hole receiving the hot melt hose. The inner surface adapted to support the hot melt hose without generally deforming the hot melt hose. In addition, the body is adapted to be supported by the tie device and includes at least one of either a groove on the inner surface or a passage extending through the body for positioning the tie device within the groove or the passage. Thus, the hanger may include only the groove, only the passage, or both the groove and the passage.

In yet another aspect, the body is slidably affixed onto the hot melt hose so that the hanger may be movably positioned along the hot melt hose. In the alternative, the hanger may be removably attached to the hot melt hose. Moreover, the hanger is manufactured from a material having material properties that withstand temperatures generally greater than 130° F.

In use, the hot melt hose and the hanger is routed adjacent to the structure for mounting the hot melt hose and the hanger to the structure. The hanger supports the hot melt hose without generally deforming the hot melt hose. The hanger also spaces the hot melt hose from the structure such that at least a portion of the hanger is between the hot melt hose and the structure. Furthermore, the tie device is inserted into at least one of the groove on the inner surface or the passage for tightening the tie device around both the hanger and the structure. Thereby, the hanger is mounted to the structure.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

DETAILED DESCRIPTION

Figure 1:
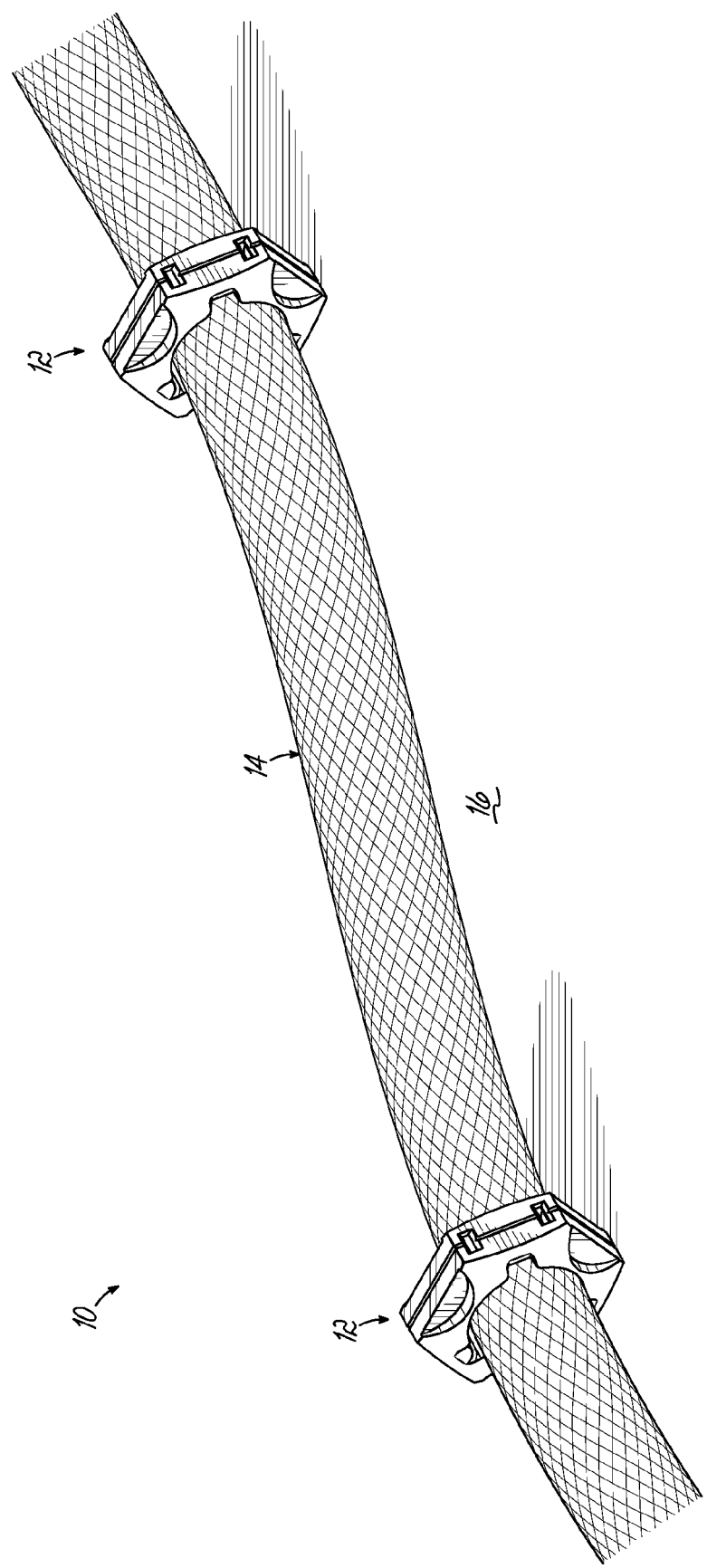
FIG. 1 is a perspective drawing of one embodiment of an apparatus including a first embodiment of a pair of hangers and a hot melt hose.

With reference to FIG. 1, an embodiment of the apparatus 10 includes a hanger 12 and a hot melt hose 14 for fluidly communicating hot melt components in a hot melt system (not shown). According the embodiment shown in FIG. 1, more than one hanger 12 is used to support the hot melt hose 14 on the floor 16 without generally deforming the hot melt hose 14. The hanger 12 is permanently attached to the hose 14 and sized to accommodate the hose 14 extending therethrough. In the alternative, the hanger 12 may be releasably attached to the hot melt hose 14, such as according to another embodiment discussed below. The hanger 12 frictionally engages the hose 14 to maintain a fixed position without the application of an external force. The external force may be applied to the hanger 12 to overcome the frictional engagement and slide the hanger 12 along any position of the hose 14. However, the frictional engagement and the external force on the hot melt hose 14 are insufficient to generally deform or otherwise mechanically harm the hot melt hose 14. Thus, a plurality of the hangers 12 may be positioned in a variety of configurations to support the hose 14 along any variety of routes required within an industrial environment. According to the exemplary embodiment of the apparatus 10, one hanger 12 is provided on the hose 14 for generally every two feet of hose 14.

Figure 2:
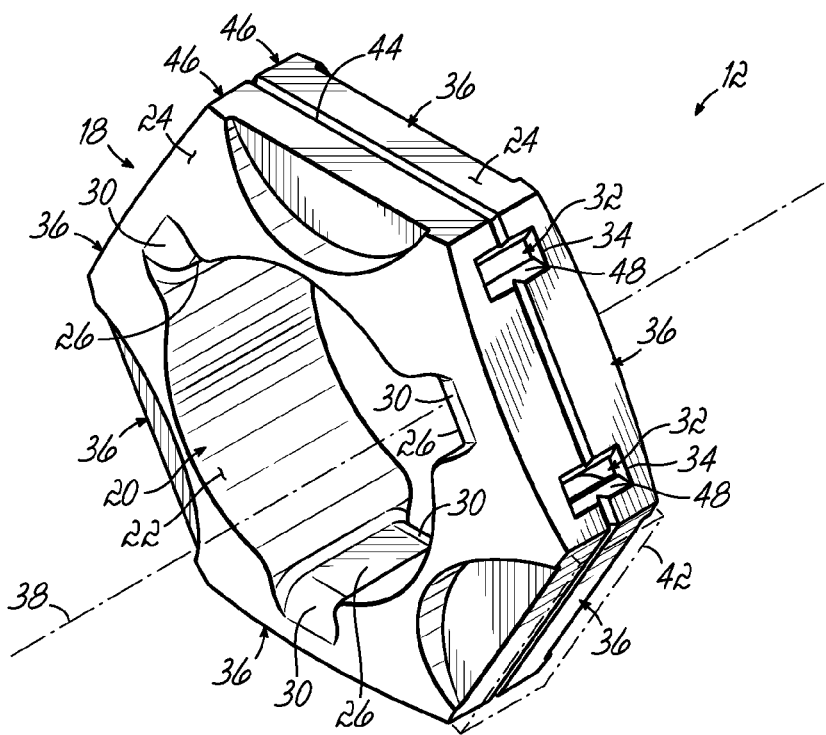
FIG. 2 is a perspective drawing of the first embodiment of the hanger of FIG. 1.

FIG. 2 shows a first embodiment of a hanger 12. The hanger 12 generally includes a body 18 having a through hole 20. The through hole 20 defines an inner surface 22 adapted to support the hot melt hose 14. More particularly, the hot melt hose 14 is supported without generally deforming, crushing, or otherwise creating excessive mechanical or thermal stress concentrations within the hot melt hose 14 that increase the likelihood of premature mechanical failure of the hot melt hose 14. In addition to the inner surface 22, the body 18 also includes an outer surface 24.

According to the exemplary embodiment of the hanger 12, the body 18 is a rigid, ring-like structure having a generally circular through hole 20 with the inner surface 22 being generally cylindrical. However, the ring-like structure is not intended to be limited to a circular shape. For instance, the ring-like structure may be any desirable shape that surrounds or at least substantially surrounds the hot melt hose 14. The ring-like structure may be further inclusive of generally square ring-like structures and/or generally elongate ring-like structures adapted to extend along the hot melt hose 14. The inner surface 22 includes a groove 26 adapted to position a tie device, such as a cable tie 28, therein (see FIGS. 4A-6B). The tie device discussed herein may be the cable tie 28, hook and loop fastener, rope, string, or any similar device capable of tying and/or tightening the hanger 12 to another structure through the body 18, such as the groove 26. More particularly, the body 18 may have a groove chamfer 30 leading into the groove 26 for reducing stress concentrations at the inner surface 22. In order to increase the number of locations in which the tie device may be positioned at the inner surface 22, a plurality of the grooves 26 may be positioned, such as symmetrically, on the inner surface 22.

Similarly, the body 18 may also include a passage 32 extending therethrough adapted to position the tie device. Each passage 32 includes a pair of openings 34 in which to thread the tie device from one end of the passage 32 to another. In the alternative, the passage 32 may also have ends sharing a single opening 34, in which case, the outer surface may only include one opening 34. In order to increase the number of locations in which the tie device may be positioned on the outer surface 24, a plurality of the grooves 26 may be positioned, such as symmetrically, on the outer surface 24. While the exemplary embodiment described herein includes three grooves 26 and three passages 32 symmetrically positioned around the through hole 20, it will be appreciated that any number of grooves 26 and/or passages 32 may be included on the body 18 in any desirable position. For instance, the body 18 may include either one or more grooves 26, one or more passages 32, or one or more grooves 26 and passages 32 on the inner and outer surfaces 22, 24.

The outer surface 24 further includes a generally planar portion 36 adapted to abut against another structure, the floor 16, or another hanger 12. The generally planar portion 36 improves the stability of the hanger 12 positioned against another generally planar surface. It will be appreciated that the outer surface 24 may have any structure or geometry for abutting against another structure. However, according to the present embodiment, the entirety of the outer surface 24 includes a plurality of planar portions 36 symmetrically positioned around the through hole 20. Thus, the ring-like body 18 has the generally cylindrical inner surface 22 and a hexagonal outer surface 24.

The through hole 20 further defines a hanger axis 38. The hanger 12 is adapted to receive the hot melt hose 14 such that a hose central axis (not shown) generally aligns with the hanger axis 38. The plurality of the grooves 26 and the plurality of the passages 32 are offset from, but generally extend along and generally extend transverse to the hanger axis 38, respectively. According to the exemplary embodiment, the plurality of grooves 26 and the plurality of the passage 32 extend generally parallel and extend generally perpendicular to the hanger axis 38, respectively. Thereby, the hanger 12 and the hot melt hose 14 are adapted to be mounted via the tie device relative to the abutting structure in either a generally parallel or generally perpendicular orientation. The inner surface 22 and outer surface 24 define a gap distance 40 to the abutting structure. While the ring-like body 18 includes a relatively uniform gap distance 40, the body 18 may, in the alternative, vary geometrically such that the gap distance 40 from the inner surface 22 to the outer surface 24 varies around the hanger axis 38. It will also be appreciated that the groove 26 and passage 32 may be positioned in any orientation with respect to the central axis 38 for mounting the hose 14 via the tie device in any orientation. Thus, the gap distance 40 and the orientation of the groove 26 and passage 32 may vary in accordance with the principles of the invention described herein.

As an alternative to the tie device, the hanger 12 may also be mounted to adjacent structure via a receiving bracket (not shown). The receiving bracket may be separately attached to the adjacent structure or integrated into the adjacent structure. In either case, the hanger 12 is adapted to couple with the receiving bracket for mounting the hot melt hose 14 to the adjacent structure. The hanger 12 may also mount to the adjacent structure via one or more magnets 42. Accordingly, the adjacent structure and/or the hanger 12 has at least one magnet 42 and another magnetically attractive surface, such as another magnet, sheet metal, or steel surface. For example, the magnet 42 may be attached to the generally planar portion 36 of outer surface 24 for magnetically coupling the hanger 12 to a metallic, adjacent structure. One exemplary embodiment of the magnet 42 is shown in FIG. 2. However, it will be appreciated that that one or more magnets 42 may be attached anywhere to the hanger 12 for mounting the hanger 12. The magnet 42 may be formed of any material sufficient for generating sufficient magnetic force to mount the hanger 12 receiving the hose 14 to the adjacent structure. One such magnetic material is a samarium-cobalt alloy. While the hanger 12 may be mounted to the adjacent structure via the tie device, the receiving bracket, or the magnet 42, it will be appreciated that any mechanical structure or applied force for mounting the hanger 12 to the structure may be used for routing the hose 14 in the industrial environment.

Generally, the hanger 12 is manufactured from a material having material properties capable of withstanding relatively high temperatures that may exist in the environment of the hot melt hose 14. For instance, the material preferably withstands average temperatures of at least 130° F. and increases in temperatures of at least generally between 150° F.-170° F. However, the material may be capable of performing under any range of temperatures in which the hot melt hose 14 may be used. According to the exemplary embodiment, the material is Ryton® or a similar performing thermoplastic.

The body 18 is manufactured from a pair of body sections 46 thereby facilitating the manufacture of the passage 32. More particularly, each body section 46 has a portion of the passage 32 formed therein. A pair of body sections 46 are attached together at a seam 44 so that the portions of the passages 32 align to define the passage 32. The body 18 is generally symmetrical about the seam 44 and may be formed by ultrasonically welding the pair of body sections 46 together at the seam 44. The seam 44 is also recessed to prevent excess material from the body sections 46 from interfering with the general flatness of the generally planar portion 36. However, it will be appreciated that the hanger 12 may be manufactured using various methods in accordance with the principles of this invention.

Figure 3:
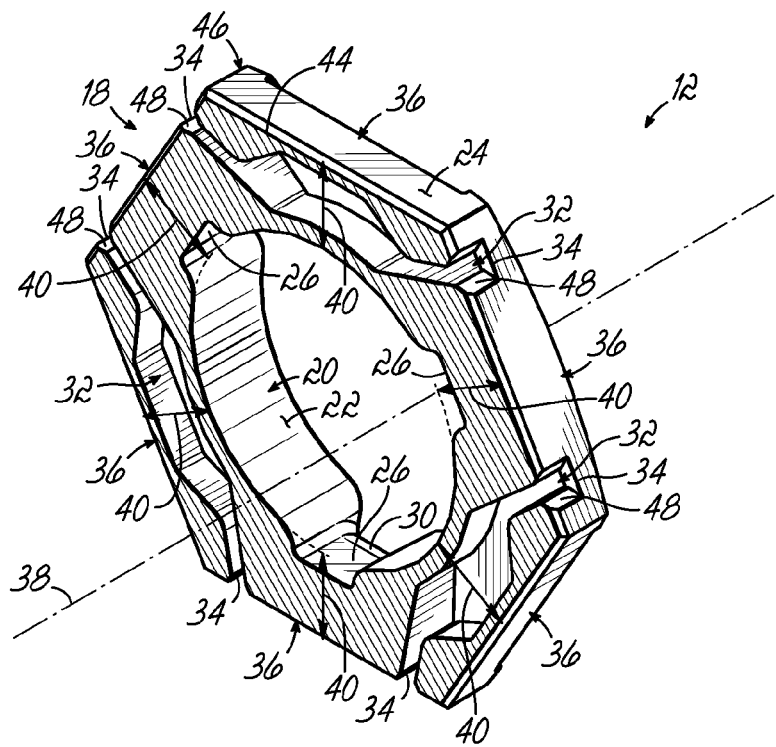
FIG. 3 is a perspective sectional drawing generally bisecting the first embodiment of the hanger of FIG. 1.

FIG. 3 shows the hanger 12 bisected along the seam 44 for showing the plurality of the passages 32 in greater detail. As described above, each passage 32 opens to the outer surface 24 at the plurality of the openings 34. In addition, each opening has an opening chamfer 48 for reducing stress concentrations within the body 18. Generally, the passage 32 extends through the body 18 between the inner and outer surfaces 22, 24. The passage 32 is also relatively smooth having an interior surface that generally funnels toward the pair of openings 34 for directing tie devices inserted therein toward at least one opening 34.

Figure 4A:
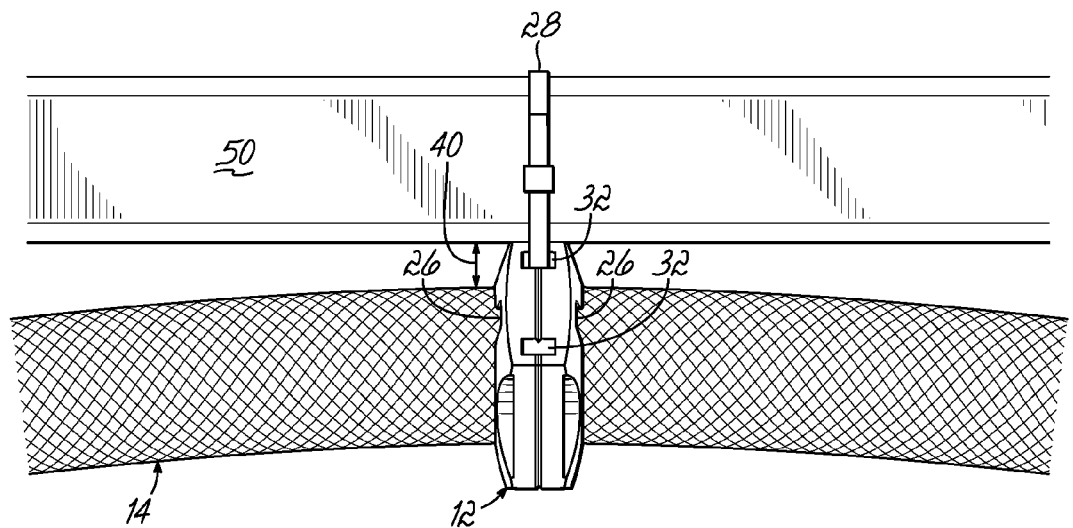
FIG. 4A is a side view drawing of the apparatus of FIG. 1 mounted generally parallel to a beam member.
Figure 4B:
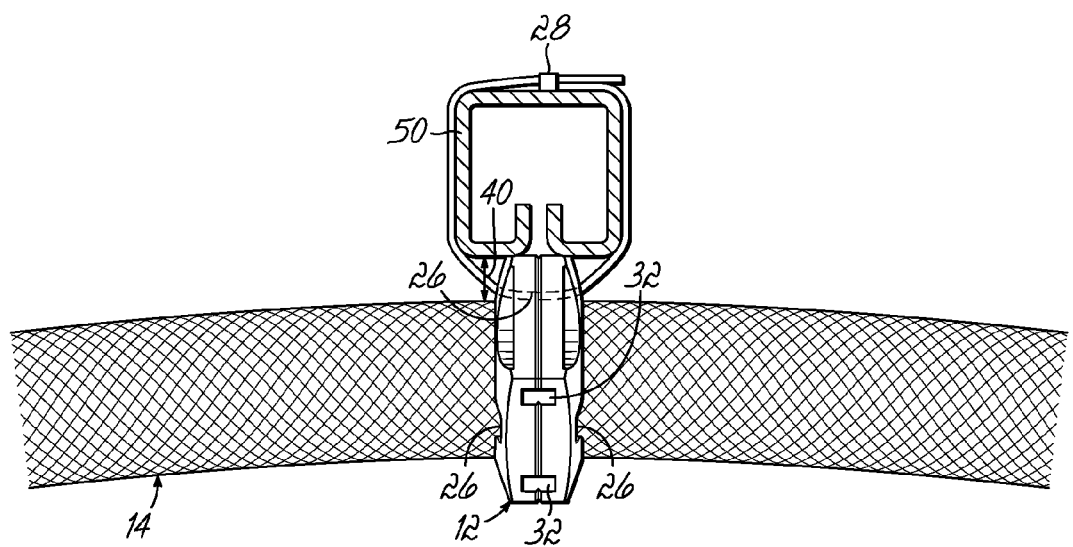
FIG. 4B is a side view drawing of the apparatus of FIG. 1 mounted generally perpendicular to a beam member.

FIGS. 4A-4B, 5A-5B and 6A-6B show the apparatus 10 tightened or otherwise coupled to a structure, such as a beam member 50, via the cable tie 28 in various configurations. In each configuration, the hanger 12 is shown supporting the hot melt hose 14 without generally deforming the hot melt hose 14, i.e., in any manner that would have negative effects on the hose 14. With respect to FIGS. 4A-4B, FIG. 4A shows a cable tie 28 extending through the passage 32 and around the beam member 50. More particularly, the outer surface 24 directly abuts against the adjacent beam member 50. Thus, the hot melt hose 14 is mounted and routed generally parallel to the beam member 50 with the gap distance 40 being maintained therebetween. The gap distance 40 separates the beam member 50 from the hot melt hose 14 to minimize direct contact with the hot melt hose 14. By positioning the hose 14 generally separate and away from the nearby structure, the accumulation of thermal stress is minimized and the likelihood of mechanical harm to the hose 14 is reduced. Similarly, the cable tie 28 may extend through the groove 26 and around the beam member 50 for routing the hot melt hose 14 generally perpendicular to the beam member 50 as shown in FIG. 4B.

Figure 5A:
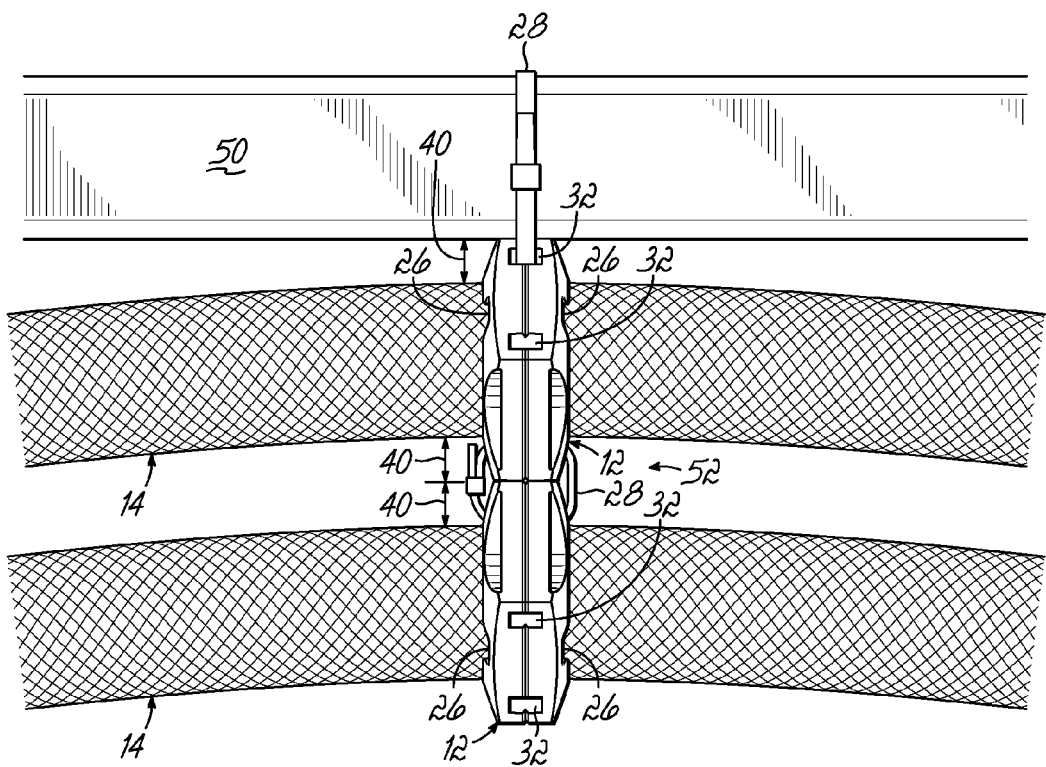
FIG. 5A is a side view drawing of a first bundle of apparatuses of FIG. 1 mounted generally parallel together and mounted generally parallel to a beam member.
Figure 5B:
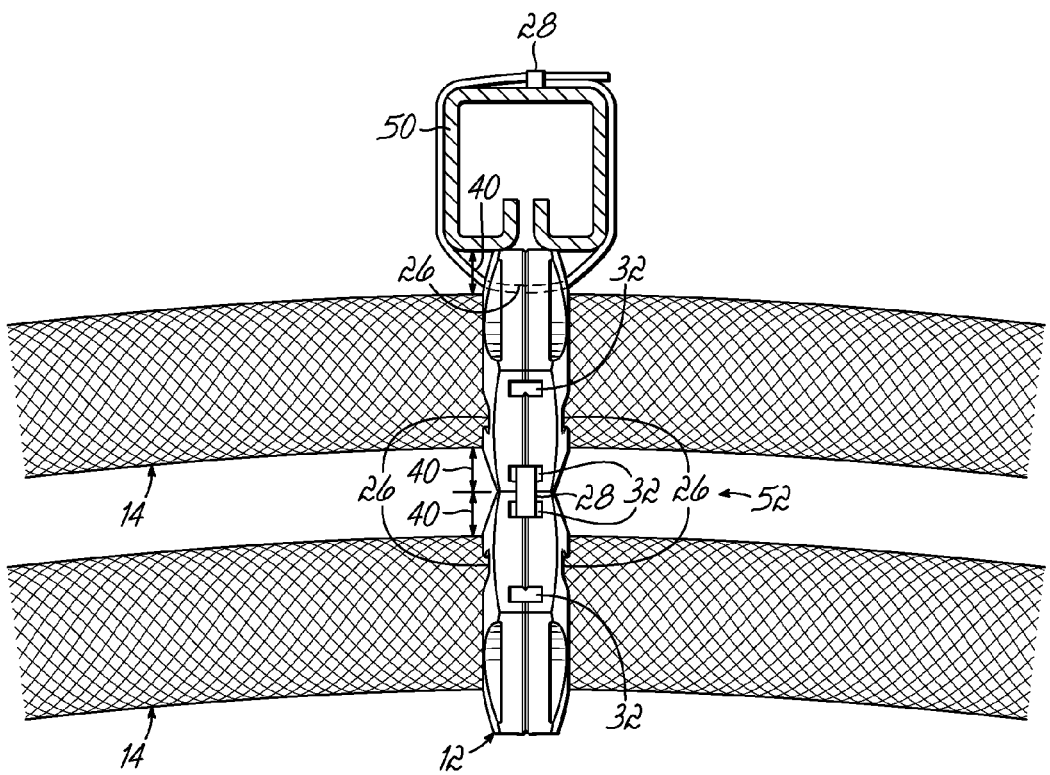
FIG. 5B is a side view drawing of a first bundle of apparatuses of FIG. 1 mounted together and mounted generally perpendicular to a beam member.

FIGS. 5A-5B show the apparatus 10 coupled to the beam member 50 as shown in FIGS. 4A-4B; however, another apparatus 10 is also shown forming a first bundle 52 of apparatus 10. The first bundle 52 is tightened together by the cable tie 28 that extends through the passages 32 on each hanger 12. Accordingly, each hot melt hose 14 of the first bundle 52 is positioned generally parallel and apart from the other hot melt hose 14 by approximately twice the gap distance 40.

Figure 6A:
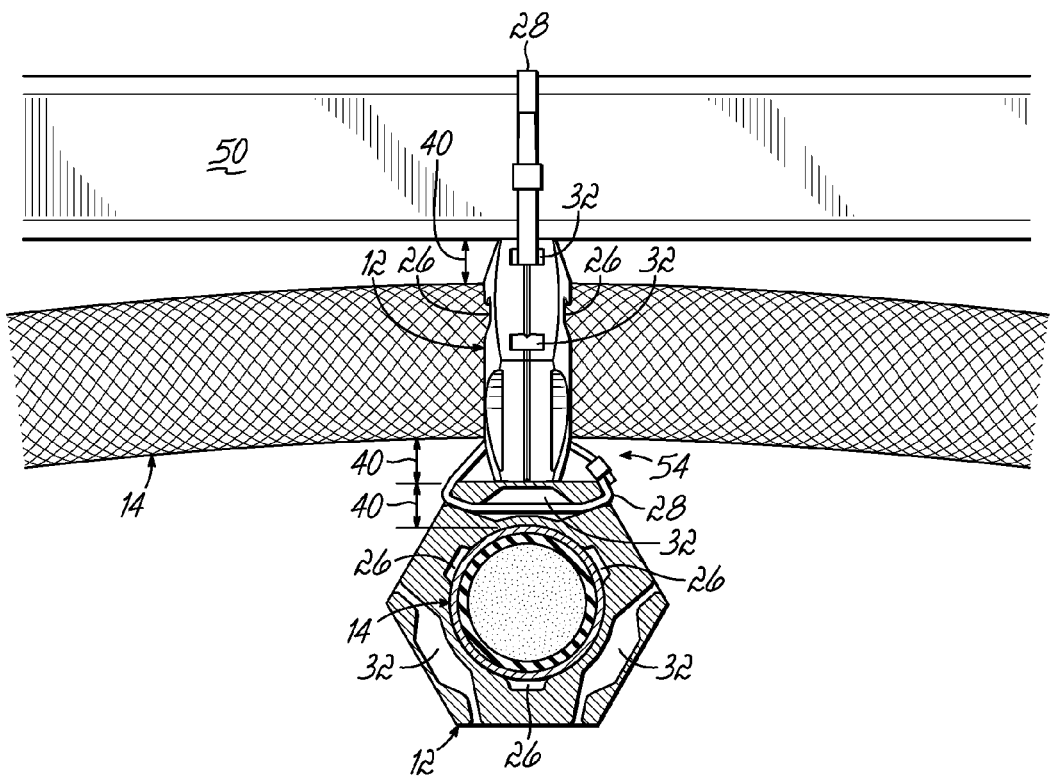
FIG. 6A is a side view drawing of a second bundle of apparatuses of FIG. 1 mounted generally perpendicular together and mounted generally parallel and perpendicular to a beam member.
Figure 6B:
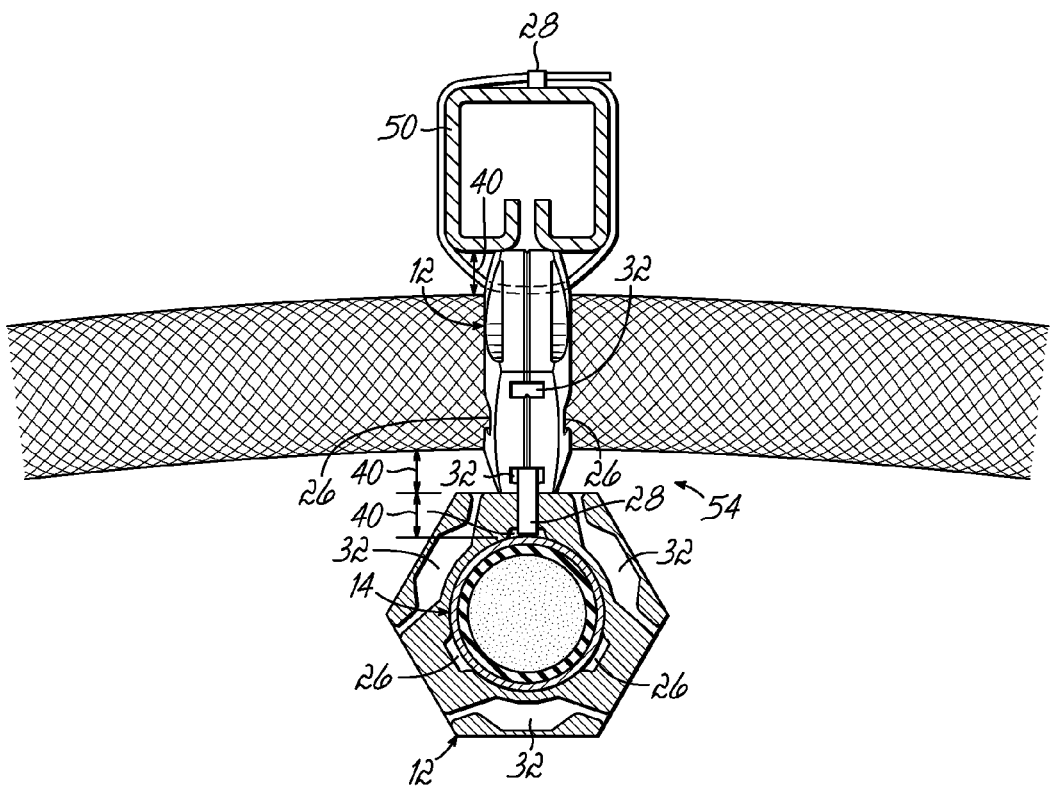
FIG. 6B is a side view drawing of a second bundle of apparatuses of FIG. 1 mounted generally perpendicular together and mounted generally perpendicular and parallel to a beam member.

FIGS. 6A-6B show the apparatus 10 coupled to the beam member 50 as shown in FIGS. 4A-4B; however, another apparatus 10 is also shown forming a second bundle 54 of apparatus 10. The second bundle 54 is tightened together by the cable tie 28 that extends through the passage 32 on each hanger 12. Accordingly, each hot melt hose 14 of the second bundle 52 is positioned generally perpendicular and apart from the other hot melt hose 14 by the gap distance 40. In addition, one of the hangers 12 is bisected along the seam 44 showing the exemplary embodiments of the cable tie 28 inserted through the passage 32, in FIG. 6A, and the groove 26, in FIG. 6B.

Furthermore, another configuration of the apparatus 10 is shown in FIG. 1 as the apparatus 10 is laid along the floor 16, or similar structure in the industrial environment. The hanger 12 serves to support the hot melt hose 14 above the floor 16 at the gap distance 40 to similarly prevent mechanical and thermal stresses as discussed above. The hanger 12 also generally rests on the floor 16 at the generally planar portion 36 in order to prevent the hanger 12 from rolling along the floor 16. While the present configuration of FIG. 1 shows only one apparatus 10 laid on the floor 16, it will be appreciated any number of hangers 12 may be bundled together similar to the first and second bundles 52, 54 and laid upon the floor 16.

With respect to the configurations shown in FIG. 1 and FIGS. 4A through 6B, any tie device may be used to couple the hanger 12 to the beam member 50 and/or another hanger 12. Also, the parallel and/or perpendicular orientation of the hot melt hoses 14 relative to the beam member 50 or another hanger 12 is essentially dependent on the orientation of the grooves 26 and/or passages 32, respectively. Thus, the configurations need not be limited to parallel and perpendicular orientations. Moreover, it will be appreciated that any number of apparatus 10 with hangers 12 may be coupled together forming any number of bundle configurations for routing the hot melt hoses 14 through the industrial environment.

Figure 7:
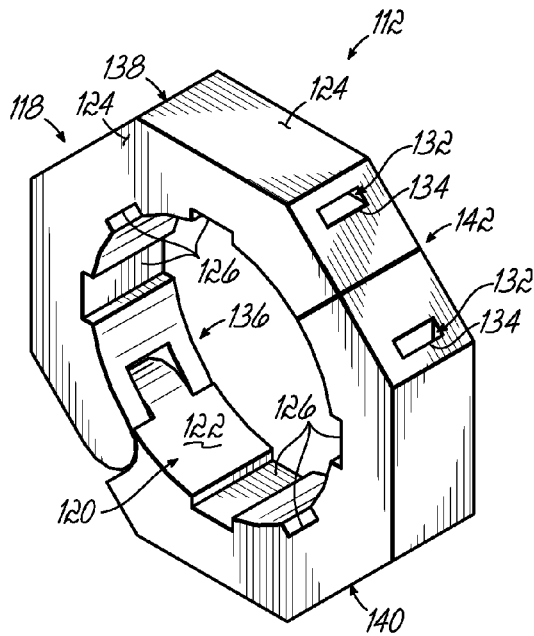
FIG. 7 is a perspective drawing of a second embodiment of a hanger.
Figure 8:
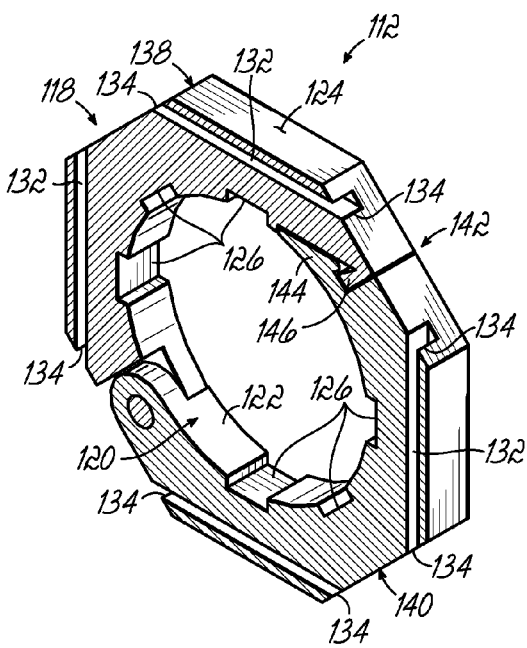
FIG. 8 is a perspective sectional drawing generally bisecting the second embodiment of the hanger of FIG. 7.

FIGS. 7 and 8 show a second embodiment of a hanger 112 that includes a body 118 having a through hole 120 defining an inner surface 122 with a groove 126 adapted to support the hot melt hose 14 without generally deforming the hot melt hose 14 similar to that of the first embodiment. The second embodiment of the body 118 also includes a passage 132 extending therethrough and an outer surface 124 having an opening 134 to the passage 132. In addition, the second embodiment of the hanger 112 further includes a hinge 136 pivotally connecting an upper or first body element 138 and a lower or second body element 140. Upper and lower body elements 138, 140 separate at a latch 142 for opening the hanger 112. More particularly, the latch 142 includes a tab 144 that snaps into a detent 146. The hanger 112 may be opened and closed/locked via the latch 142 for removably positioning the hanger 112 on and/or off of the hot melt hose 14. Thus, the hanger 112 is suited well for replacing broken hangers or being an accessory to pre-existing hot melt hoses 14 presently without hangers 100.

Figure 9:
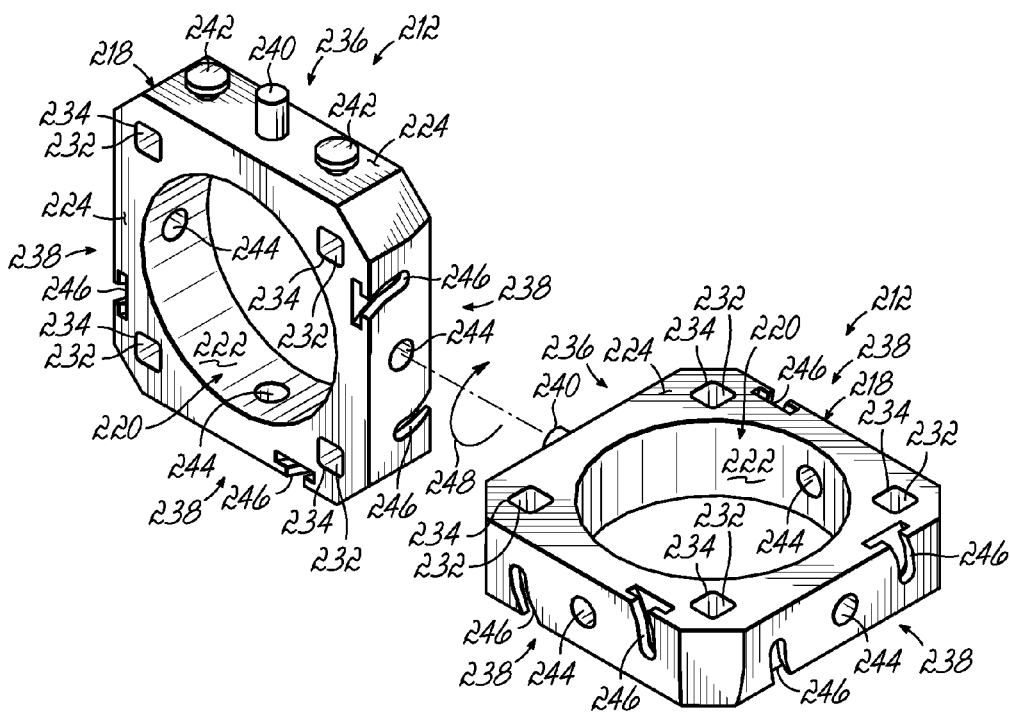
FIG. 9 is a perspective drawing of a pair of hangers according to a third embodiment.
Figures 10, 11:
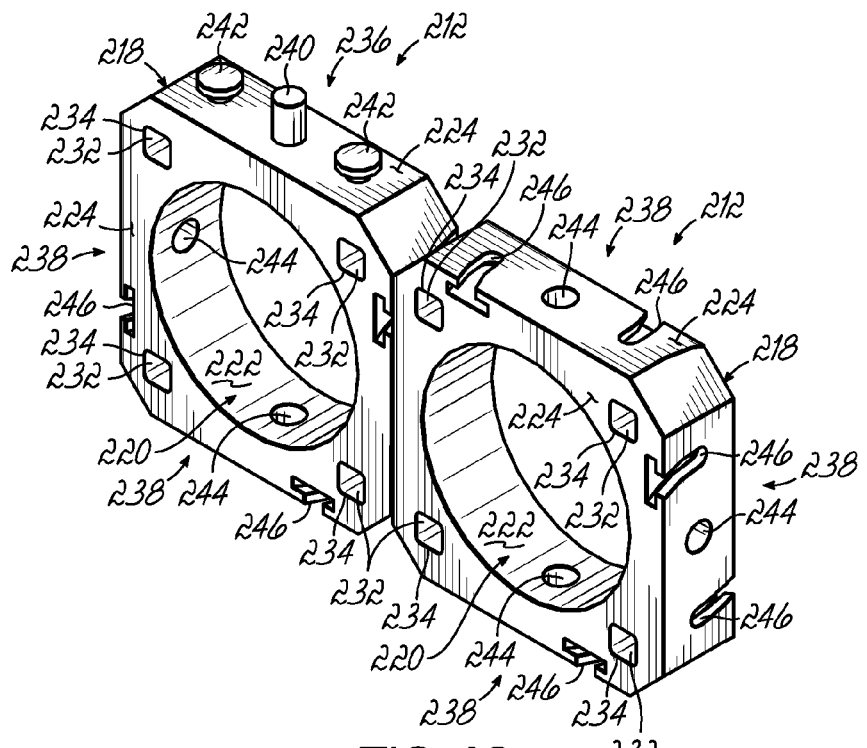
FIG. 10 is a perspective drawing of the pair hangers of FIG. 9 connected together.
FIG. 11 is a perspective sectional drawing generally bisecting the hangers shown in FIG. 10.

FIGS. 9-11 shows a third embodiment of a hanger 212 that includes a body 218 having a through hole 220 defining an inner surface 222 adapted to support the hot melt hose 14 without generally deforming the hot melt hose 14 similar to that of the first and second embodiments. The third embodiment of the body 218 also includes a passage 232 extending therethrough and an outer surface 224 having an opening 234 to the passage 232. In addition, hanger 212 includes a connecting end portion 236 and multiple connecting end portions 238. Generally, the body 218 includes one connecting end portion 236 and multiple connecting end portions 238 for mating to other structures having complementary end portions 236, 238. The number of each connecting end portion 236, 238 on each hanger 212 may vary if desired. Use of the connecting end portions 236, 238 can reduce the need to used the hanger 212 with the tie devices. The connecting end portions 236, 238 are more specifically shown as male and female end portions 236, 238.

The male end portion 236 includes a post 240 and a pair of tab protrusions 242 extending from the outer surface 224. The female end portion 238 includes a bore 244 and a pair of slots 246 recessed into the body 218 from the outer surface 224. Accordingly, the post 240 is adapted to be slidingly inserted into the bore 244, and the pair of tab protrusions 242 (FIG. 11) is adapted to be slidingly twisted into the pair of slots 246 for coupling the male end portion 236 to the female end portion 238.

While the male and female end portions 236, 238 are shown with the exemplary embodiment of FIGS. 9-11, it will be appreciated that male and female end portions 236, 238, or similar end portions for being mated together, may be used with any embodiment of the hangers 12, 112, 212. Thus, the male and female end portions 236, 238 are not intended to be limited to the present embodiment of hanger 212. For example, rather than provide male and female end portion 236, 238 for connecting hangers 12, 112, 212, traditional fasteners (not shown) may be used in conjunction with a locking device (not shown) for connecting the hangers 12, 112, 212.

FIGS. 9-10 show a pair of the hangers 212 being twisted into locking engagement. More particularly, the post 240 is inserted into the bore 244 for aligning the hangers 212 relative to each other. The pair of hangers 212 then twist, as indicated by arrow 248, into alignment relative to each other so that the pair of tab protrusions 242 slide into the pair of slots 246, which lockingly engage the pair of tab protrusions 242. More particularly, FIG. 11 shows the pair of hangers 212 bisected for additional details of the locking engagement. Thus, the male end portion 236 of one hanger 212 may be coupled to the female portion 238 of another hanger 212 for bundling the hangers 212 as discussed herein. Moreover, it will be appreciated that other structures, such as the floor 16 or beam member 50 may include similar male and female end portions 236, 238 allowing hot melt hoses 14 to be quickly connected and disconnected along hose routing within the industrial setting.

In use, the apparatus 10 having the first embodiment of the hanger 12 is mounted to an adjacent structure for routing the hot melt hose 14 used in the hot melt system (not shown). The hanger 12 supports the hot melt hose 14 with the hanger without generally deforming the hot melt hose 14. The hanger 12 also spaces the hot melt hose 14 from the adjacent structure at the gap distance 40 such that a portion of the hanger 12 is between the hot melt hose 14 and the adjacent structure. Once the hanger 12 abuts the adjacent structure, the hanger 12 is mounted to the structure by inserting a tie device into at least one of the groove 26 or the passage 32. The hot melt hose 14 is then mounted to the structure having either a generally perpendicular orientation or a generally parallel orientation relative to the structure.

With respect to the apparatus 10 having the second embodiment of the hanger 112, the hanger 112 may be opened or closed for removably attaching the hanger 112 to the hot melt hose 14. To open the hanger 112, the latch 142 is unsnapped so that the upper and lower body elements 136, 138 swing apart via the hinge 136. To close the hanger 112, the upper and lower body elements 136, 138 swing together via the hinge 136 and the latch 142 is snapped together.

With respect to apparatus 10 having the third embodiment of the hanger 212, the hanger 212 removably connects to other hangers 212. The post 240 of one hanger 212 is inserted into the bore 244 of another hanger. The pair of hangers 212 is then twisted 248 relative to each other. As the hangers 212 twist 248 into alignment, the pair of tab protrusions 242 engage the pair of slots 246 in locking engagement. Thus, the hangers 212 may be connected together without the use of the tie devices.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The various details and features of the embodiments may be used alone or in any desired combination. The invention in its broader aspects is therefore not limited to the specific details, representative apparatus and method and illustrative examples shown and described. Accordingly, departures may be from such details without departing from the scope or spirit of the general inventive concept.

What is claimed is:

1. A hanger for use with a tie device and a hot melt hose, the hanger including a body having a through hole for receiving the hot melt hose, the through hole defining an inner surface adapted to support the hot melt hose without generally deforming the hot melt hose, the body adapted to be supported by the tie device,
wherein the body includes a groove on the inner surface for positioning the tie device therein, the through hole defines a hanger axis, and the groove is aligned generally parallel with the hanger axis.

2. The hanger of claim 1 wherein the body includes a passage and an outer surface, the passage extends through the body to an opening in the outer surface for receiving the tie device within the passage, and the body completely surrounds at least a portion of the passage for completely surrounding at least a portion of the tie device.

3. The hanger of claim 1 wherein the body includes an outer surface having a generally planar portion for positioning the body against a structure.

4. An apparatus, comprising;
a hot melt hose; and
a hanger including a body having a through hole receiving the hot melt hose, the through hole defining an inner surface adapted to support the hot melt hose without generally deforming the hot melt hose, the body adapted to be supported by the tie device;

wherein the body includes a groove on the inner surface for positioning the tie device therein, the through hole defines a hanger axis, and the groove is aligned generally parallel with the hanger axis.

5. The apparatus of claim 4 wherein the body is slidably affixed onto the hot melt hose.

6. The apparatus of claim 4 wherein the body is removably affixed onto the hot melt hose.

7. The apparatus of claim 4 wherein the body includes a passage and an outer surface, the passage extends through the body to an opening in the outer surface for receiving the tie device within the passage, and the body completely surrounds at least a portion of the passage for completely surrounding at least a portion of the tie device.

8. The apparatus of clam 4 wherein the body includes an outer surface having a generally planar portion for positioning the body against a structure.

9. A method of routing a hot melt hose adjacent to a structure with a hanger having a body with an inner surface defining a through hole, the through hole defining a hanger axis, the hot melt hose for use with hot melt equipment, comprising;

supporting the hot melt hose with the hanger without generally deforming the hot melt hose;

spacing the hot melt hose from the structure, at least a portion of the hanger being between the hot melt hose and the structure; and inserting a first tie device into a groove on the inner surface of the body, the groove being aligned generally parallel with the hanger axis.

10. The method of claim 9 further comprising mounting the hanger to the structure with the first tie device.

11. The method of claim 10 wherein mounting the hot melt hose places the hot melt hose generally parallel to the structure.

12. The method of claim 9 wherein the body includes a passage and an outer surface, the passage extends through the body to an opening in the outer surface for receiving a second tie device within the passage, the body completely surrounds at least a portion of the passage, and the method further comprises:

inserting the second tie device into the passage such that the second tie device extends through the opening and the body completely surrounds at least a portion of the tie device.

13. A hanger for use with a tie device and a hot melt hose, the hanger including a body having a through hole for receiving the hot melt hose, the through hole defining an inner surface adapted to support the hot melt hose without generally deforming the hot melt hose, the body adapted to be supported by the tie device, wherein the body includes a passage and an outer surface, the passage extends through the body to an opening in the outer surface for receiving the tie device within the passage, and the body completely surrounds at least a portion of the passage for completely surrounding a portion of the tie device.

14. The hanger of claim 13 wherein the hole has a hanger axis, and the passage extends generally perpendicular to the hanger axis.

15. An apparatus, comprising;

a hot melt hose; and a hanger including a body having a through hole receiving the hot melt hose, the through hole defining an inner surface adapted to support the hot melt hose without generally deforming the hot melt hose, the body adapted to be supported by the tie device;

wherein the body includes a passage and an outer surface, the passage extends through the body to an opening in the outer surface for receiving the tie device within the passage, and the body completely surrounds at least a portion of the passage for completely surrounding a portion of the tie device.

16. The apparatus of claim 15 wherein the body is slidably affixed onto the hot melt hose.

17. The apparatus of claim 15 wherein the body is removably affixed onto the hot melt hose.

18. The apparatus of claim 15 wherein the hole has a hanger axis, and the passage extends generally perpendicular to the hanger axis.

19. A method of routing a hot melt hose adjacent to a structure with a hanger having a body, the body including a passage and an outer surface, the passage extending through the body to an opening in the outer surface for receiving a tie device within the passage, and the body completely surrounding at least a portion of the passage, the hot melt hose for use with hot melt equipment, the method comprising;

supporting the hot melt hose with the hanger without generally deforming the hot melt hose;

spacing the hot melt hose from the structure, at least a portion of the hanger being between the hot melt hose and the structure; and inserting the tie device into the passage such that the tie device extends through the opening and the body completely surrounds at least a portion of the tie device.

20. The method of claim 19 further comprising mounting the hanger to the structure with the tie device.

21. The method of claim 20 wherein mounting the hot melt hose places the hot melt hose generally perpendicular to the structure.

* * * * *